(12) United States Patent
Furuichi et al.

(10) Patent No.: US 11,932,281 B2
(45) Date of Patent: Mar. 19, 2024

(54) CONFIGURING AND CONTROLLING AN AUTOMATED VEHICLE TO PERFORM USER SPECIFIED OPERATIONS

(71) Applicant: International Business Machines Corporation, Armonk, NY (US)

(72) Inventors: Sanehiro Furuichi, Setagaya-ku (JP); Akira Saito, Ichikawa (JP); Yohkichi Sasatani, Yokohama (JP); Kenichi Takasaki, Shibuya (JP); Taku Sasaki, Machida (JP); Hirotaka Matsumoto, Zama (JP)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 17/482,340

(22) Filed: Sep. 22, 2021

(65) Prior Publication Data

US 2023/0091346 A1    Mar. 23, 2023

(51) Int. Cl.
*B60W 60/00*      (2020.01)
*B60W 50/00*      (2006.01)
(Continued)

(52) U.S. Cl.
CPC ...... *B60W 60/00256* (2020.02); *B60W 50/00* (2013.01); *G05B 19/042* (2013.01);
(Continued)

(58) Field of Classification Search
CPC .......... B60W 60/00256; B60W 50/00; B60W 2050/0083; G05B 19/042;
(Continued)

(56) References Cited

U.S. PATENT DOCUMENTS 9,728,089 B2 *   8/2017   Marcus ................. G08G 5/006
9,898,932 B2 *   2/2018   Brown ................. G08G 5/0034
(Continued)

FOREIGN PATENT DOCUMENTS

CN    105785876 A   *   7/2016
CN    107133771 A       9/2017
(Continued)

OTHER PUBLICATIONS

PCT Invitation to Pay Additional Fees and, Where Applicable, Protest Fee, dated Jan. 17, 2023, 11 pp., for Application No. PCT/EP2022/075992.
(Continued)

*Primary Examiner* — Peter D Nolan
*Assistant Examiner* — Peter Y Ning
(74) *Attorney, Agent, or Firm* — Konrad Raynes Davda & Victor LLP; David William Victor

(57) ABSTRACT

Provided are a computer program product, system, and method for configuring and controlling an automated vehicle to perform user specified operations. User vehicle control programs are loaded in an unmanned vehicle to control the unmanned vehicle to perform a user specified operation. The loading the user vehicle control programs replaces base vehicle control programs in the unmanned vehicle. There is communication with the unmanned vehicle to execute the user vehicle control programs to control the unmanned vehicle to perform the user specified operation. The base vehicle control programs are loaded into the unmanned vehicle to replace the user vehicle control programs to return control of the unmanned vehicle to a vehicle provider after performing the user specified operation.

25 Claims, 8 Drawing Sheets

(51) Int. Cl.
  *G05B 19/042* (2006.01)
  *G05D 1/00* (2006.01)
(52) U.S. Cl.
  CPC ... *G05D 1/0011* (2013.01); *B60W 2050/0083* (2013.01); *G05B 2219/2637* (2013.01)
(58) Field of Classification Search
  CPC .......... G05B 2219/2637; G05D 1/0011; G01C 21/343; G06Q 50/28; G06Q 10/0832
  See application file for complete search history.

(56) References Cited

U.S. PATENT DOCUMENTS

| | | | |
|---|---|---|---|
| 2015/0242972 A1* | 8/2015 | Lemmey | H04L 63/10 705/80 |
| 2016/0116914 A1* | 4/2016 | Mucci | B64U 10/13 701/2 |
| 2016/0288905 A1* | 10/2016 | Gong | G08G 5/0043 |
| 2016/0291589 A1* | 10/2016 | Ashoori | G05D 1/106 |
| 2016/0292696 A1* | 10/2016 | Gong | H04L 67/12 |
| 2016/0300492 A1* | 10/2016 | Pasko | G08G 5/0013 |
| 2017/0069214 A1* | 3/2017 | Dupray | G08G 5/0008 |
| 2017/0147975 A1* | 5/2017 | Natarajan | A47G 29/141 |
| 2019/0039751 A1* | 2/2019 | Janssen | G08G 5/0069 |
| 2019/0266346 A1* | 8/2019 | O'Brien | G06V 20/176 |
| 2020/0130829 A1* | 4/2020 | Gandiga | G05D 1/0061 |
| 2020/0226938 A1* | 7/2020 | Priest | B64C 27/00 |
| 2020/0317334 A1* | 10/2020 | Skeba | B64C 39/024 |
| 2021/0331682 A1* | 10/2021 | Song | G05D 1/0011 |

FOREIGN PATENT DOCUMENTS

| | | | | |
|---|---|---|---|---|
| CN | 112714746 B | | 2/2023 | |
| WO | WO-2015155087 A1 * | 10/2015 | | A47G 29/14 |
| WO | WO-2021010495 A1 * | 1/2021 | | B64C 13/18 |
| WO | WO-2022106598 A1 * | 5/2022 | | G06Q 10/04 |
| WO | WO-2023046642 A1 * | 3/2023 | | B06W 50/00 |

OTHER PUBLICATIONS

PCT International Search Report and Written Opinion, dated Mar. 13, 2023, 18 pp., for Application No. PCT/EP2022/075992.

Hornyak, T., "Japan's Alsok to Launch Warning System for Unwelcome Drones", [online], May 14, 2015, [Retrieved on Jun. 22, 2021], Retrieved from the Internet at <URL: https://www.pcworld.com/article/2922552/japans-alsok-to-launch-warning-system-for-unwelcome-drones.html>, 5 pp.

IBM Corp., "IBM Cloud Docs: Managing Image Security with Vulnerability Advisor", [online], Last Updated Sep. 10, 2021, [Retrieved on Sep. 22, 2021], Retrieved from the Internet at <URL: https://cloud.ibm.com/docs/Registry?topic=va-va_index&interface=ui>, 6 pp.

Kubernetes, "CaseStudy: Denso", [online], [Retrieved on Jun. 22, 2021], Retrieved from the Internet at <URL: https://kubernetes.io/case studies/denso/>, 3 pp.

Nestybox, "Enhancing Drone.io with System Containers", [online], Sep. 24, 2019, [Retrieved on Jun. 16, 2021], Retrieved from the Internet at <URL: https://blog.nestybox.com/2019/09/24/drone.html>, 10 pp.

Pettigrew, M., "Drone Deliveries Could Solve Supply Chains' "Last Mile"", [online] Dec. 16, 2020, [Retrieved on Sep. 12, 2021], Retrieved from the Internet at <URL: https://medium.com/predict/drone-deliveries-could-solve-supply-chains-last-mile-993499e4f3a2>, 5 pp.

Secom Co, Ltd., "Approaching Drones: Secom Drone Detection System Launches to Support Rapid Response with Early Intrusion Detection", [online], Jan. 14, 2016, Retrieved from the Internet at <URL: http://www.secom.co.jp/corporate/release/2015/nr_20160114.html>, 4 pp.

Trusted Computing Group, "Replacing Vulnerable Software with Secure Hardware", White Paper, [online], [Retrieved on Jun. 22, 2021], Retrieved from the Internet at <URL: https://trustedcomputinggroup.org/resource/replacing-vulnerable-software-with-secure-hardware/>, 6 pp.

Wang, Y., et al., "Adapting a Container Infrastructure for Autonomous Vehicle Development", arXiv:1911.01075 [cs.SE], Nov. 19, 2019, 6 pp.

Wikipedia, "Last Mile (Transportation)", [online], Last Edited Aug. 20, 2021, Retrieved from the Internet at <URL: https://en.wikipedia.org/wiki/Last_mile_(transportation)>, 5 pp.

U.S. Appl. No. 17/079,434, filed Oct. 24, 2020, entitled "Substitute Autonomous Vehicle Data", by Uchida et al., 59 pp.

Taiwan Office Action dated Oct. 23, 2023, 4 pp., for Application No. TW111119799.

* cited by examiner

Vehicle Verification Information

Base Vehicle Configuration

Transmitted Vehicle Verification Information

CONFIGURING AND CONTROLLING AN AUTOMATED VEHICLE TO PERFORM USER SPECIFIED OPERATIONS

BACKGROUND OF THE INVENTION

1. Field of the Invention

The present invention relates to a computer program product, system, and method for configuring and controlling an automated vehicle to perform user specified operations.

2. Description of the Related Art

The "last mile" describes a problem in supply chain management and transportation planning to transport goods and services from a distribution facility to a final destination in an urban or other area, such as a private facility, residential location, etc., where the optimal routes may not be known or are located in restricted areas. This problem is becoming of greater importance with the increased use of online purchasing where retailers must deliver the goods directly to the residence or business facility of the purchaser, and where the purchaser location is in an urban area with significant traffic and theft problems. The final part of the delivery, i.e., "last mile" is often the most expensive portion of the transportation cost.

One effort in development to reduce the costs associated with the "last mile" problem involves the use of unmanned aerial vehicles, i.e., drones, to deliver goods and services to a user location.

There is a need in the art for improved techniques for delivering goods and services using unmanned vehicles.

SUMMARY

Provided are a computer program product, system, and method for configuring and controlling an automated vehicle to perform user specified operations. User vehicle control programs are loaded in an unmanned vehicle to control the unmanned vehicle to perform a user specified operation. The loading the user vehicle control programs replaces base vehicle control programs in the unmanned vehicle. There is communication with the unmanned vehicle to execute the user vehicle control programs to control the unmanned vehicle to perform the user specified operation. The base vehicle control programs are loaded into the unmanned vehicle to replace the user vehicle control programs to return control of the unmanned vehicle to a vehicle provider after performing the user specified operation.

With the above embodiment, the unmanned vehicle is updated with base vehicle control program to control the unmanned vehicle, such as controlling the unmanned vehicle for the "last mile" to a user destination to perform the user specified operation. Loading the user vehicle control programs to replace the base vehicle control programs allows the user to control how the unmanned vehicle operates in a controlled area and also prevents the vehicle provider from accessing and controlling the unmanned vehicle while under control of the user. Further, the base vehicle programs are loaded back into the unmanned vehicle to return control of the unmanned vehicle to the vehicle provider in a state before the user took control.

In a further embodiment, the user vehicle control programs are loaded into the unmanned vehicle at a user receiving location in a controlled area to perform the user specified operation at a user designated location in the controlled area. The user specified operation comprises at least one of delivering a package at the user designated location, receiving a package at the user designated location to transport from the controlled area, and perform operations at the user designated location in the controlled area.

With the above embodiment, loading the user vehicle control programs provides the user complete control over how the unmanned vehicle operates while within a controlled area. The vehicle provider may no longer access the base vehicle control programs while the unmanned vehicle is in the controlled area because the base vehicle control programs have been replaced with the user vehicle control programs during time the unmanned vehicle is operating in the controlled area to perform a user specified action, such as delivering and receiving a package.

In a further embodiment, the user specified operation comprises the unmanned vehicle receiving a package at the user designated location in the controlled area to return to a return location outside of the controlled area. A package monitoring program is loaded in the unmanned vehicle, as part of loading the user vehicle control programs, to monitor the package obtained by the unmanned vehicle at the user designated location. The loading the vehicle routing programs retains the package monitoring program that monitors the package while the unmanned vehicle transports the package to the return location.

With the above embodiment, a package monitoring program is retained in the unmanned vehicle even after loading the base vehicle control programs back into the unmanned vehicle for return to the vehicle provider to continue monitoring of the obtained package while returning from the controlled area to an area outside of the controlled area. The package may maintain sensitive devices or substances that may need to be monitored and controlled by the package monitoring program after leaving the controlled area. The vehicle provider may remove the package monitoring program after the package has been delivered In a further embodiment, the unmanned vehicle includes a computer hardware layer, operating system layer, and container platform to execute containers of code to control the unmanned vehicle. The user vehicle control programs are implemented in user vehicle control containers and wherein the base vehicle control programs are implemented in base vehicle control containers.

With the above embodiment, a container platform may provide a runtime environment to allow seamless replacement of the base vehicle control programs with the user vehicle control programs to provide the user immediate control over the operations and functionality of the unmanned vehicle, and to allow returning of the base vehicle control programs to the runtime environment when returning the unmanned vehicle to vehicle provider control.

In a further embodiment, the base vehicle control programs are saved in a repository before loading the user vehicle control programs in the unmanned vehicle. Data from a memory in the unmanned vehicle is saved with the base vehicle control programs as part of loading the user vehicle control programs. Data is erased from the memory in the unmanned vehicle in response to saving the data to the at least one memory area. The saved data is written to the memory as part of loading the base vehicle control programs back into the unmanned vehicle.

With the above embodiment, data, such as state data from a memory of the unmanned vehicle, before being updated with the user vehicle control programs, is saved with the base vehicle control programs. The saved data may then be restored to the unmanned vehicle when returning to the vehicle provider to restore to the state of programs and data before the unmanned vehicle is updated with the user vehicle control programs. Further erasing the data in the vehicle memory before writing the saved data back prevents the vehicle provider from accessing any information and data the unmanned vehicle gathers as part of operating in the controlled area.

Further provided are a computer program product, method, and system for managing an unmanned vehicle. User vehicle control programs and a verification program are loaded in an unmanned vehicle to perform user specified operations. The loading of the user vehicle control programs and the verification program replace base vehicle control programs controlled by a vehicle provider. Vehicle configuration information of installed programs in the unmanned vehicle, including the base vehicle control programs and the verification program, gathered by the verification program after the user vehicle control programs and verification program are loaded, are saved. Transmitted vehicle configuration information is received from a detected unmanned vehicle. A determination is made as to whether the transmitted vehicle configuration information matches the saved vehicle configuration information. An alert is generated that the unmanned vehicle is not an authorized vehicle in response to determining that the current vehicle configuration information does not match the saved vehicle configuration information.

With the above embodiment, vehicle configuration information of installed programs in an unmanned vehicle authorized to perform user specified operations is saved. This saved vehicle configuration information is later used to determine whether a detected unmanned vehicle, which may or may not be the same the vehicle for which configuration is saved, is operating with authorized programs that match the programs previously loaded into the unmanned vehicle. In this way, a surveillance system may determine whether an unmanned vehicle is operating with authorized vehicle configuration information. If not, then the unmanned vehicle is loaded with programs the user did not approve and may be operating in a malicious manner, such as gathering data in a secure controlled area. The described embodiments generate an alert of an intrusion if the detected unmanned vehicle is not operating with a previously loaded vehicle configuration.

In a further embodiment, a determination is made of a geographical position of the detected unmanned vehicle. The transmitted vehicle configuration information and position information determined by the detected unmanned vehicle is received and a determination is made as to whether the geographical position and the position information match. The alert is generated in response to determining that the position information and the geographical position do not match.

With the above embodiment, a surveillance system detecting the unmanned vehicle also determines the geographical position of the detected vehicle in order to verify that the unmanned vehicle sending the transmitted vehicle configuration information is the same vehicle detected at the geographical position, as determined by having a matching geographical position. In this way, the surveillance system can be assured that it is checking whether the detected unmanned vehicle sent the transmitted vehicle configuration information matching the saved vehicle configuration information previously loaded In a further embodiment, an encryption key generated for the unmanned vehicle is transmitted to the unmanned vehicle for the verification program to use for transmissions. The encryption key is associated with the saved vehicle configuration information. The transmitted vehicle configuration information is decrypted with the encryption key. The determining whether the transmitted vehicle configuration information matches comprises determining whether the decrypted transmitted vehicle configuration information matches the saved vehicle configuration information associated with the encryption key.

With the above embodiment, the unmanned vehicle loaded with the user vehicle control programs is provided the encryption key to use for secure transmissions with other devices, such as a surveillance system, so that the unmanned vehicle can be assured it is communicating with an authorized device. The surveillance system may decrypt the transmitted vehicle configuration information and then compare the received decrypted vehicle configuration information with the saved vehicle configuration information associated with the encryption key, the vehicle itself used to encrypt the transmitted vehicle configuration information. This successful decryption and determination of matching assures the surveillance system that the unmanned vehicle presenting the transmitted vehicle configuration information is an authorized vehicle by using a secure encryption key provided when the user vehicle control programs are loaded.

DETAILED DESCRIPTION

One issue faced in using unmanned vehicles to deliver goods and services to a final destination from a distribution center, known as the "last mile", is the lack of detailed maps and other information to allow the movement of the unmanned vehicle through a controlled area, such as private property, a private facility, large scale multiple dwelling complex, a corporate office, factory, government facilities, etc. Unmanned vehicles owned by third parties may also be barred from travelling through sensitive controlled areas because of concerns of the unmanned vehicle being controlled to capture sensitive information using cameras and other sensors.

Described embodiments provide improvements to computer technology for using unmanned vehicles to deliver goods and services by having the unmanned vehicle travel to a user location, such as a controlled area, where user vehicle control programs are loaded into the unmanned vehicle, to replace the pre-existing base vehicle control programs. This allows the user to control how the unmanned vehicle will operate and travel through the controlled area and limit the unmanned vehicle to traverse the controlled area in a manner prescribed by the user. With the user vehicle control programs installed, the vehicle provider may no longer have access to control the unmanned vehicle while operating in the controlled area. Further, after the unmanned vehicle completes a mission, then the base vehicle control programs may be loaded back into the unmanned vehicle, replacing the user vehicle control programs, to return control of the unmanned vehicle back to the vehicle provider. By loading user vehicle control programs, the unmanned vehicle may be programmed with the most efficient route to reduce the costs associated with transporting the goods or service on the "last mile".

Described embodiments further provide improvements to computer technology for monitoring unmanned vehicles in a controlled area by allowing a surveillance system to obtain, from a detected unmanned vehicle, configuration information of installed programs in the unmanned vehicle. The surveillance system may determine whether the received vehicle configuration information matches saved vehicle configuration information of user vehicle control programs loaded into the unmanned vehicle to perform the user specified operation. If there is a match, then the detected unmanned vehicle is authorized to proceed through the controlled area. If there is not a match, then an alert may be generated to notify the controlled area operator of an unauthorized unmanned vehicle operating in the controlled area. In this way, an unauthorized unmanned vehicle may be identified in the controlled area and an intervention may occur to disable the unmanned vehicle or expel from the controlled area.

Figure 1:
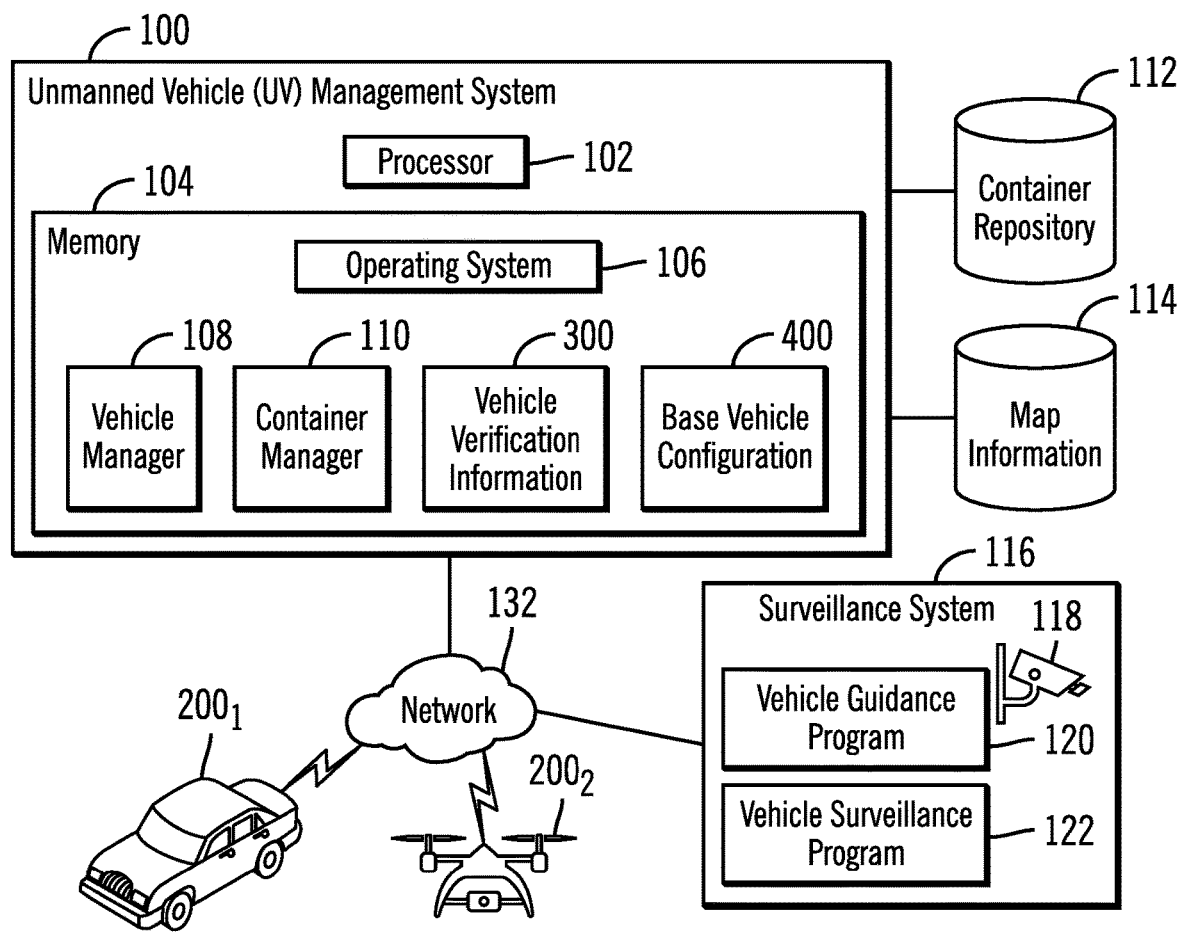
FIG. 1 illustrates an embodiment of an unmanned vehicle management system to control unmanned vehicles to perform a user specified action at a user location.

FIG. 1 illustrates an embodiment of an unmanned vehicle ("UV") management system 100 in which embodiments are implemented. The UV management system 100 includes a processor 102 and a main memory 104. The main memory 104 includes various program components including an operating system 106; a vehicle manager 108 to control an unmanned vehicle $200_1$, $200_2$; a container manager 110 to load containers of program code in a container repository 112 and map information 114, including routes in a controlled area in which the unmanned vehicle is authorized to operate, into an unmanned vehicle $200_1$, $200_2$; vehicle verification information 300, for each unmanned vehicle $200_1$, $200_2$ operated by the vehicle manager 108, used to verify whether a detected unmanned vehicle is only operating with authorized software containers; and a base vehicle configuration $400_i$, for each unmanned vehicle $200_1$, $200_2$ operated by the vehicle manager 108, comprising the base vehicle containers and stored state information in the unmanned vehicle $200_1$, $200_2$ before the user vehicle control containers were loaded by the container manager 110.

The UV management system 100 may interact with multiple surveillance systems 116 that monitor unmanned vehicle $200_1$, $200_2$ operating in a controlled area, such as a facility, plant, government restricted area, residence complex, etc. The surveillance systems 116 include a camera 118 or other sensing devices, such as motion detectors, sound detectors, radar, etc., a vehicle guidance program 120 to receive vehicle control commands from the vehicle manager 108 to guide unmanned vehicles $200_1$, $200_2$ through the controlled area, and a vehicle surveillance program 122 to interact with the unmanned vehicles $200_1$, $200_2$ to obtain vehicle information and information on installed vehicle control containers to determine whether the unmanned vehicles $200_1$, $200_2$ are operating in an authorized manner. If a detected unmanned vehicle $200_1$, $200_2$ is not operating in an authorized manner, such as includes software containers not loaded by the container manager 110, then the surveillance system 116 may generate an alert of an unauthorized potentially malicious vehicle in the area.

The vehicle surveillance program 122 may communicate with the UV management system 100 to obtain vehicle verification information 300 used to determine whether a detected unmanned vehicle is authorized to operate in a controlled area.

Figure 2:
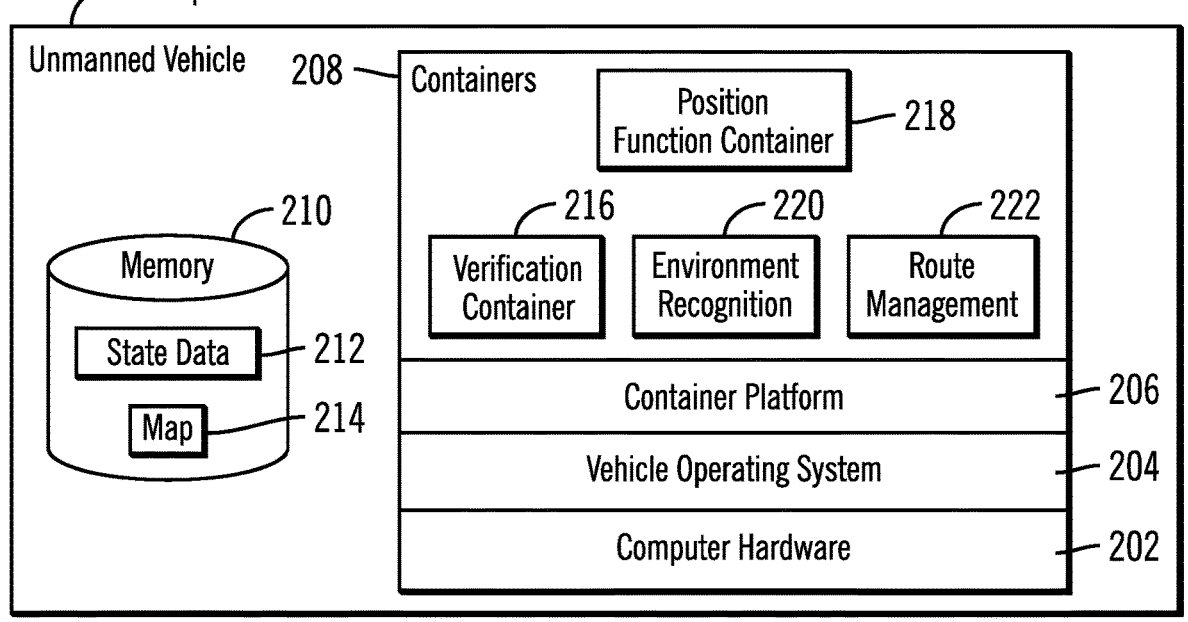
FIG. 2 illustrates an embodiment of components in an unmanned vehicle.

FIG. 2 illustrates an embodiment of components in an unmanned vehicle $200_i$, such as the unmanned vehicles $200_1$, $200_2$, and includes a computer hardware layer 202, a vehicle operating system 204, and a vehicle container platform 206 to interact with the vehicle operating system 204 and provide a run-time environment on which program containers 208 execute. The unmanned vehicle $200_i$ includes a memory 210, such as a non-volatile and/or volatile memory to store state data 212 comprising parameters and other information generated by the containers 208 to operate and control the vehicle $200_i$. The memory 210 may further store map data 214 provided by the UV management system 100 of permitted routes for the unmanned vehicle $200_i$ to travel in the controlled area. The containers 208 may include a verification container 216 to interact with the vehicle surveillance program 122 to verify the vehicle $200_i$ is authorized to operate in a controlled area; a position function container 218 to determine and provide location information of the vehicle $200_i$, such as longitude and latitude, such as Global Positioning System (GPS) or some other means to interact with beacons to determine position; an environment recognition container 220 to recognize the physical environment around the vehicle $200_i$ and move by using permitted sensor devices. For example, a camera is often deployed to sense the environment around the vehicle. However, if the operator of the controlled area does not permit using a camera for security reasons, an alternative method such as radio guidance will be provided by the operator of the controlled area; and a route management container 222 to control the movement of the vehicle along a map 214 or route provided by the UV management system 100. Additional containers other than shown may be loaded on the container platform 206 for different types of operations.

The unmanned vehicle $200_i$ would further include all the mechanisms for movement, such as motors, robotics, legs, rotors, wheels, blades, engines, etc. as well as any other mechanisms for operations, such as robotic arms and grippers to deliver and receive packages and other delivery mechanisms to deliver other goods, such as a watering system, dispersal of agricultural chemicals, etc. The terms unmanned vehicles and vehicles, as used herein, may comprise any type of vehicle capable of being operated autonomously or under remote control from a remote operator, including, but not limited to, an automobile, aerial vehicle, drone, boat, submerged vehicle, wheeled robot, legged robot, etc. Although two unmanned vehicles $200_1$, $200_2$ are shown, there may be any number of unmanned vehicles operating under control of the UV management system 100 in a controlled area.

In one embodiment, the containers 208 may implement a container architecture, such as a Kubernetes architecture, where a container comprises a group of applications that share processing and data, and may support a larger function in the scheme of vehicle operations, such as the functions of the containers described above. Other container architectures may be used. In alternative embodiments, the programmable program code and logic implemented in containers 112, 208 may be implemented in other program code formats, and may comprise program code loaded into a memory for execution by a processor or firmware implemented in hardware devices.

The memory 104, 210 may comprise suitable volatile or non-volatile memory devices.

Generally, program modules, such as the program components 106, 108, 110, 120, 122, 204, 206, 208, 216, 218, 220, 222, 112, 114, 116 may comprise routines, programs, objects, components, logic, data structures, and so on that perform particular tasks or implement particular abstract data types. The program components and hardware devices of the systems 100, 116, $200_1$, $200_2$, $200_i$ of FIGS. 1 and 2 may be implemented in one or more computer systems, where if they are implemented in multiple computer systems, then the computer systems may communicate over a network.

The program components 106, 108, 110, 120, 122, 204, 206, 208, 216, 218, 220, 222, 112, 114, 116 may be accessed by a processor from a memory to execute. Alternatively, some or all of the program components 106, 108, 110, 120, 122, 204, 206, 208, 216, 218, 220, 222, 112, 114, 116 may be implemented in separate hardware devices, such as Application Specific Integrated Circuit (ASIC) hardware devices.

The functions described as performed by the programs 106, 108, 110, 120, 122, 204, 206, 208, 216, 218, 220, 222, 112, 114, 116 may be implemented as program code in fewer program modules than shown or implemented as program code throughout a greater number of program modules than shown.

The network 132 may comprise a Storage Area Network (SAN), Local Area Network (LAN), Intranet, the Internet, Wide Area Network (WAN), peer-to-peer network, wireless network, arbitrated loop network, etc. The network 132 communication with the unmanned vehicles $200_1$, $200_2$ includes wireless communication.

Figure 3:
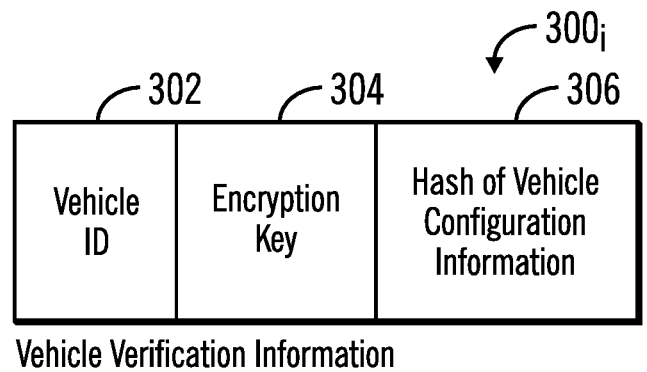
FIG. 3 illustrates an embodiment of vehicle verification information used to verify whether an unmanned vehicle is authorized to operate in a controlled area.

FIG. 3 illustrates an embodiment of an instance $300_i$ of vehicle verification information 300 for each vehicle operating in a controlled area under control of the UV management system 100 and surveillance systems 116, and includes a unique vehicle ID 302 for which the information $300_i$ is provided; an encryption key 304 generated for the vehicle 302; and a hash of vehicle configuration information 306. The vehicle configuration information subject to the hash function may comprise one or more of an image of the containers 208 in the unmanned vehicle 302 after they are loaded by the UV management system 100 and device information, such as information of onboard devices, model, type, etc.

The encryption key 304 may be generated according to different encryption methods, such as a public-private key pair where the public key is distributed to the unmanned vehicle and the private key retained by the UV management system 100 and surveillance system 116, a symmetric key, or other cryptographic type keys.

Figure 4:
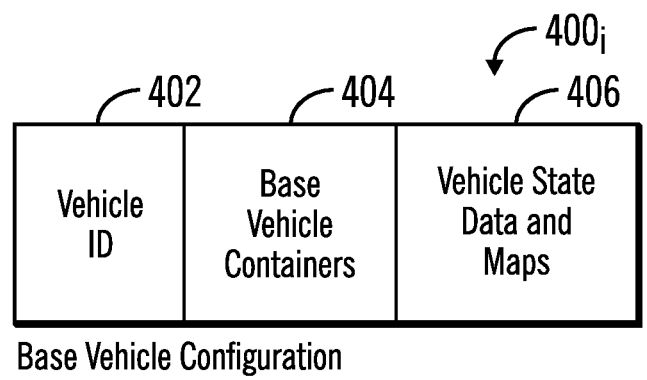
FIG. 4 illustrates an embodiment of a base vehicle configuration installed in an unmanned vehicle from a vehicle provider, which is replaced by user vehicle control programs to operate the unmanned vehicle to perform user specified actions.

FIG. 4 illustrates an embodiment of an instance $400_i$ of base vehicle configuration 400, and includes a vehicle ID 402; base vehicle containers 404 included in the vehicle 402 before they were replaced with user vehicle containers from the container repository 112; and saved vehicle state data and maps 406 included in the vehicle 402 before configuration by the container manager 110 for use by the user. In this way, the base vehicle configuration 400 includes the state of programs/containers, data, and maps in a vehicle $200_i$ before being utilized in the controlled area.

Figure 5:
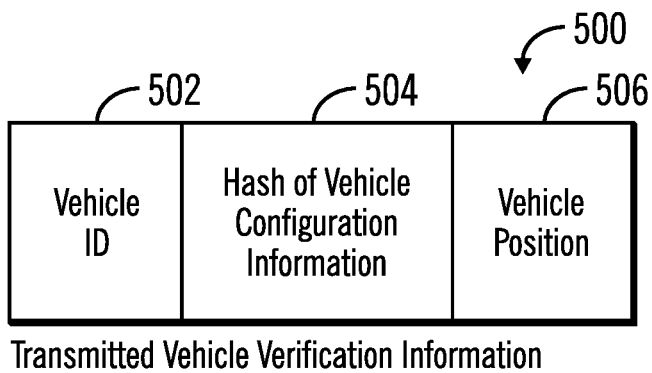
FIG. 5 illustrates an embodiment of transmitted vehicle verification information the unmanned vehicle transmits to allow a surveillance system in the controlled area to verify whether the unmanned vehicle is authorized to operate in the controlled area.

FIG. 5 illustrates an embodiment of transmitted vehicle verification information 500 transmitted by the verification container 216 to the surveillance system 116 to verify that the unmanned vehicle $200_i$ detected by the surveillance system 116 is operating in an authorized manner in the controlled area, and includes: a vehicle identifier 502 of the vehicle $200_i$ transmitting the information; a hash 504 of the vehicle containers 216-222 loaded by the UV management system 100 into the vehicle $200_i$, such as generated by applying a hash function to an image of the installed vehicle containers 216-222 and vehicle information; and a vehicle position 506 detected by the unmanned vehicle $200_1$.

Figure 6:
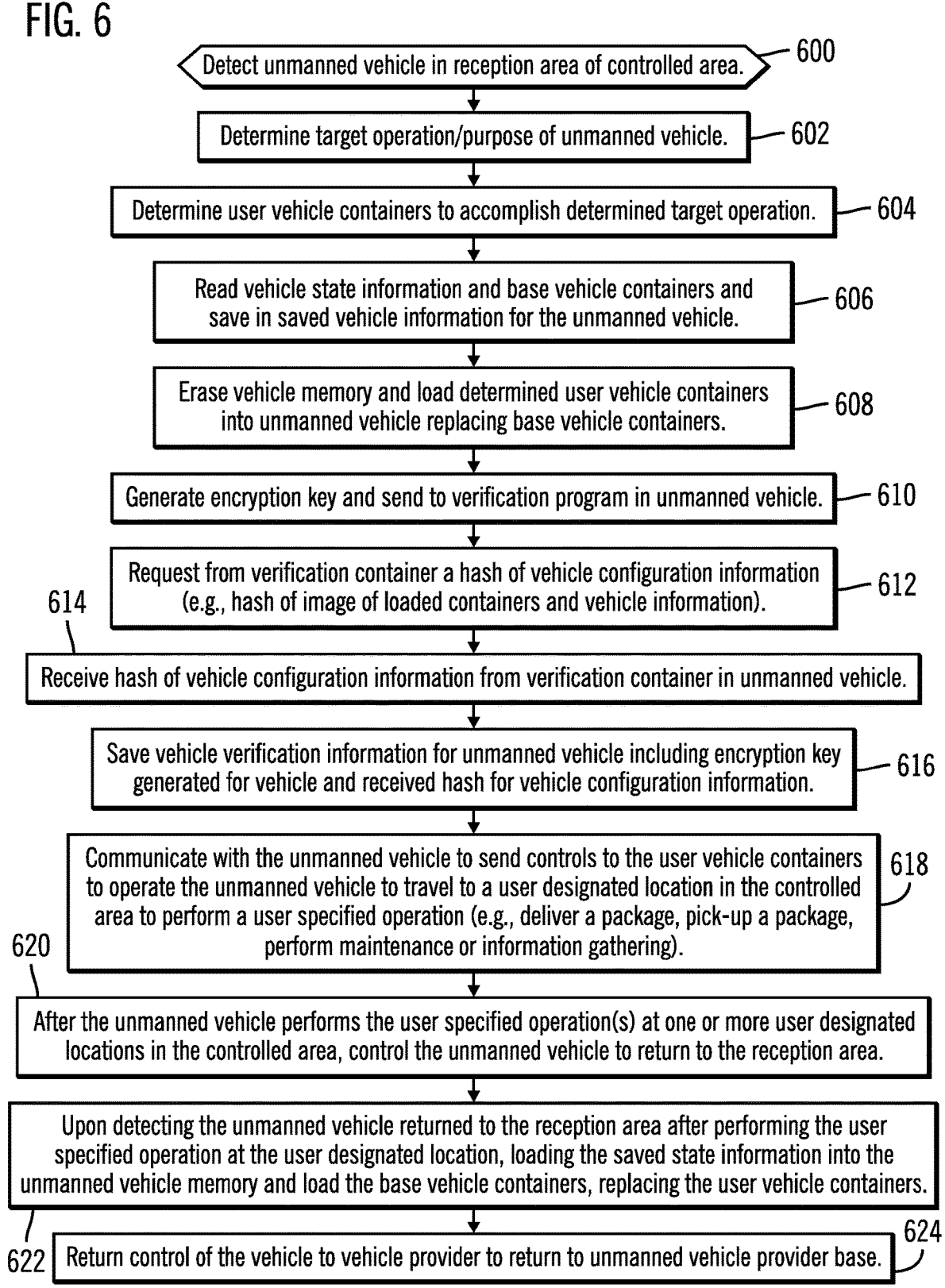
FIG. 6 illustrates an embodiment of operations to configure an unmanned vehicle to operate in a controlled area.

FIG. 6 illustrates an embodiment of operations performed by the vehicle manager 108 and container manager 110 to take control of an unmanned vehicle $200_i$ arriving at a facility or other controlled area to control within the controlled area. Upon detecting (at block 600) an unmanned vehicle $200_i$ in a reception area of the controlled area, for receiving unmanned vehicles $200_i$, the vehicle manager 108 determines (at block 602) a target operation/purpose of the unmanned vehicle $200_i$ at the reception area, such as by communicating with the unmanned vehicle $200_i$ to receive information on its operations and purpose in the controlled area, which may be preprogrammed by the vehicle provider for use by the operator of the controlled area. The operator of the UV management system 100 and controlled area may have contracted or engaged with a third party to provide the unmanned vehicle $200_i$ for a purpose at a specific location in the controlled area, such as package delivery, package pick-up, maintenance operations at the controlled area, etc. The vehicle manager 108 determines (at block 604) from the container repository 112 the containers needed to accomplish the determined user specified operation or purpose. The vehicle manager 108 communicates with the unmanned vehicle $200_i$ to read (at block 606) vehicle state data 212 and maps 214 and an image of the base vehicle containers already installed in the unmanned vehicle $200_i$ and save in base vehicle configuration $400_i$, for the vehicle $200_i$, a vehicle ID 402, base vehicle containers 404, and the vehicle state data and maps 406 as provided by the vehicle provider. The container manager 110 communicates with the unmanned vehicle $200_i$ to erase (at block 608) the vehicle memory 210 and then loads the determined user vehicle containers 216-222 into the unmanned vehicle $200_i$ replacing the saved base vehicle containers 404.

The vehicle manager 108 may further generate (at block 610) an encryption key 304 unique to the unmanned vehicle $200_i$ to send to the verification container 216 in the unmanned vehicle $200_i$ to use for communication with the UV management system 100. The vehicle manager 108 requests (at block 612) from the verification container 216 a hash of vehicle configuration information (e.g., hash of image of loaded containers and vehicle information, such as model, type, onboard devices and systems, etc.). Upon receiving (at block 614) the hash of vehicle configuration information from the verification container 216 in the unmanned vehicle $200_i$, the vehicle manager 108 saves (at block 616) vehicle verification information $300_i$ for the unmanned vehicle including the encryption key 304 generated for the vehicle $200_i$ and the received hash of vehicle configuration information 306. In an alternative embodiment, the UV management system 100, such as container manager 110, may calculate the hash of the vehicle configuration information 306.

The vehicle manager 108 communicates (at block 618) with the unmanned vehicle $200_i$ to send controls to the user vehicle containers 208, such as route management container 222, to operate the unmanned vehicle to travel to a user designated location in the controlled area to perform a user specified operation (e.g., deliver a package, pick-up a package, perform maintenance on the unmanned vehicle or at devices or structures in the controlled area). After the unmanned vehicle $200_i$ performs the user specified operation (s) at one or more user designated locations in the controlled area, the vehicle manager 108 remotely controls (at block 620) the unmanned vehicle $200_i$ to return to the reception area. The vehicle manager 108 may further disable certain devices in the unmanned vehicle $200_i$, such as cameras, to prevent the unmanned vehicle $200_i$ from unauthorized gathering of images and video of the controlled area. Upon the UV manager system 100 detecting (at block 622) that the unmanned vehicle $200_i$ returned to the reception area of the controller area after performing the user specified operation at the user designated location, the container manager 110 loads the saved state data and maps 406 into the unmanned vehicle memory 210 and loads the base vehicle containers 404 onto the container platform 206, replacing the user vehicle containers 216-222. After the unmanned vehicle $200_i$ is returned to its state when it arrived at the controlled area, the vehicle manager 108 communicates with the vehicle provider to return (at block 624) control of the vehicle to the vehicle provider to control the vehicle $200_i$ to returned to the vehicle provider base.

With the embodiment of operations of FIG. 6, an operator or owner of a controlled area receiving unmanned vehicles from a third party vehicle provider to operate in the controlled area loads application containers to control the unmanned vehicle to perform user approved operations, replacing the application programs included by the vehicle provider. In this way, the operator/user of the controlled area maintains strict control over the operations and activities the unmanned vehicle can conduct in the controlled area to limit operations to those for which the unmanned vehicle was specifically provided. The containers loaded by the UV management system 100 of the controlled area operator may limit unmanned vehicle operations and travel routes to only those authorized by the user to limit the ability of a third party to control the unmanned vehicle to gather confidential and proprietary information in the controlled area or perform unauthorized operations. The UV management system 100 may then restore the unmanned vehicle to its state before arriving at the controlled area when the use of the unmanned vehicle in the controlled area completes. This returns the unmanned vehicle to the vehicle provider in the state in which it was provided, with any confidential information gathered while operating in the controlled area removed.

Figure 7:
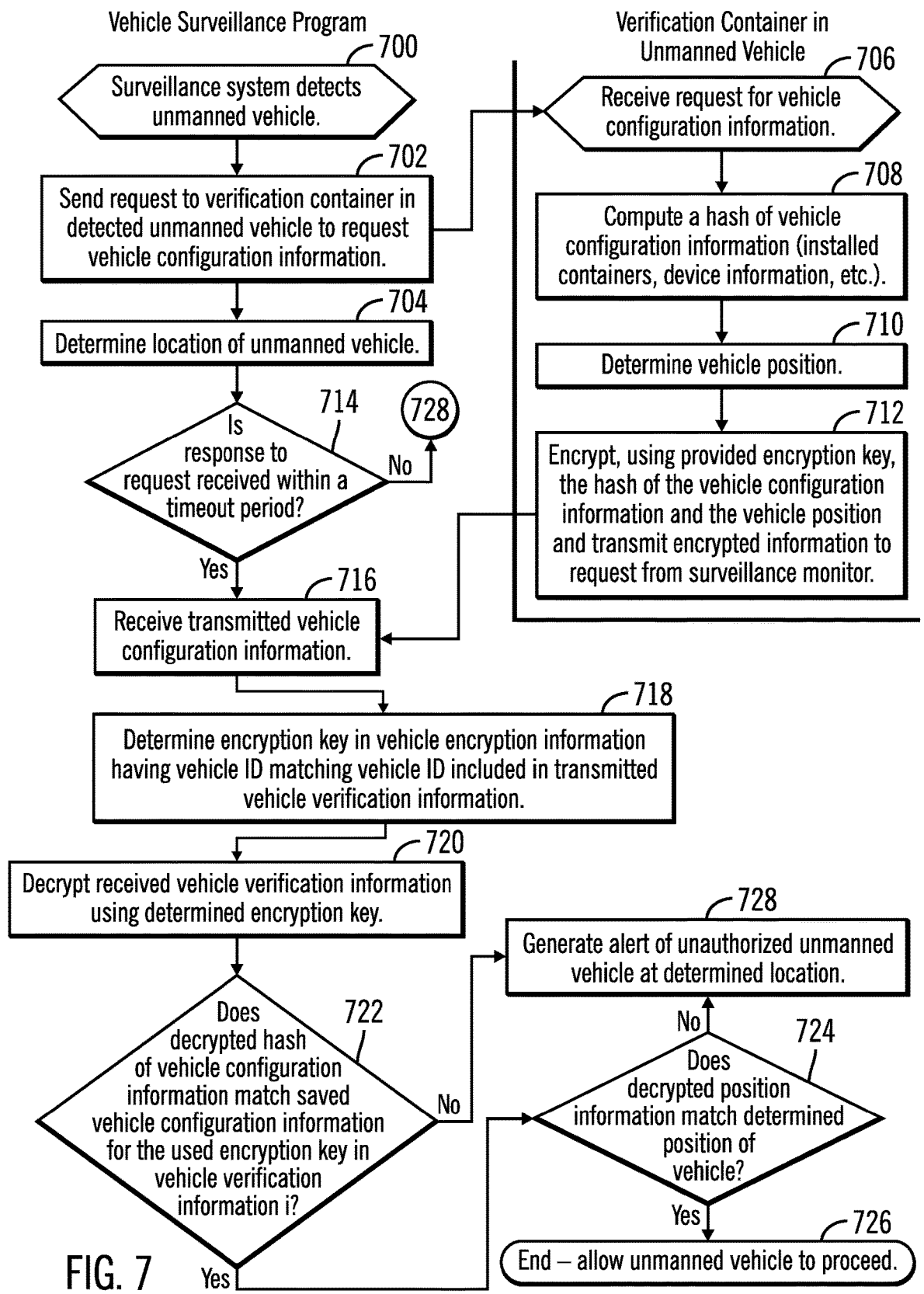
FIG. 7 illustrates an embodiment of operations to verify whether a detected unmanned vehicle in a controlled area is authorized to operate in the controlled area.

FIG. 7 illustrates an embodiment of operations performed by the vehicle surveillance program 122 in the surveillance system 116 and the verification container 216 in the unmanned vehicle $200_i$ to determine whether an unmanned vehicle detected in a controlled area, which may or may not comprise an unmanned vehicle $200_i$ as described with respect to FIG. 2, is authorized to operate in the controlled area. Upon (at block 700) the surveillance system 116 detecting an unmanned vehicle $200_i$, such as in a reception area, then the surveillance program 122 sends (at block 702) a request to verification container 216 in the detected unmanned vehicle to request vehicle configuration information. The detected unmanned vehicle may or may not include a verification container 216, and may comprise a vehicle that has not been subject to the loading of containers of FIG. 6, such as an intruder vehicle. In response to receiving (at block 706) the request, if the unmanned vehicle comprises an unmanned vehicle $200_i$, then the verification container 216 computes (at block 708) a hash of vehicle configuration information 504, which may comprise one or more of vehicle containers installed on the container platform and vehicle device information. The vehicle position is determined (at block 710) from a GPS or by communicating with a broadcasting beacon to determine the location. The verification container 216 encrypts (at block 712), using the provided encryption key, the hash of the vehicle configuration information 504 and the vehicle position 506 to generate, and transmits the encrypted vehicle verification information 500 to the request from the vehicle surveillance program 122. The vehicle ID 502 in the transmitted vehicle verification information 500 may not be encrypted.

If (at block 714) the transmitted vehicle information 500 is received (at block 716) within a timeout period, then the vehicle surveillance program 122 determines (at block 718) the encryption key 304 in vehicle verification information $300_i$ having a vehicle ID 302 matching vehicle ID 502 in the transmitted vehicle verification information 500. The received vehicle verification information 500 is decrypted (at block 720). If (at block 722) the decrypted hash of the vehicle configuration information 504 matches the saved hash of the vehicle configuration information 306 in the vehicle verification information $300_i$ having the vehicle ID 302 matching vehicle ID 502 in the transmitted vehicle verification information 500, then the vehicle surveillance program 122 determines (at block 724) whether the decrypted position 506 matches the determined vehicle position. If (at block 724) there is a match, then the unmanned vehicle $200_i$ is allowed to proceed (at block 726) without taking further action because the detected unmanned vehicle $200_i$ has been verified by ensuring the vehicle has only authorized containers installed by the UV management system 100 and was previously verified and confirmed. If (at block 714) a response to the request to the unmanned vehicle $200_i$, sent at block 702, is not received within a timeout period or if (at block 722) the hash of the vehicle configuration information 504 in the transmitted vehicle information 500 does not match the saved hash of the vehicle configuration information 306 or if (at block 724) the position of the unmanned vehicle as determined by the surveillance system 116 and sent 506 in the transmitted information does not match, then an alert is generated (at block 728) to security personnel that an unauthorized unmanned vehicle is at the determined location in the controlled area.

The embodiment of operations of FIG. 7 allows surveillance systems 116 in the controlled area that detect unmanned vehicles to query the unmanned vehicle to determine if they have approved containers loaded to confirm they are operating under control of the operator of the controlled area and not controlled through unauthorized programs and code by a third party.

Figure 8:
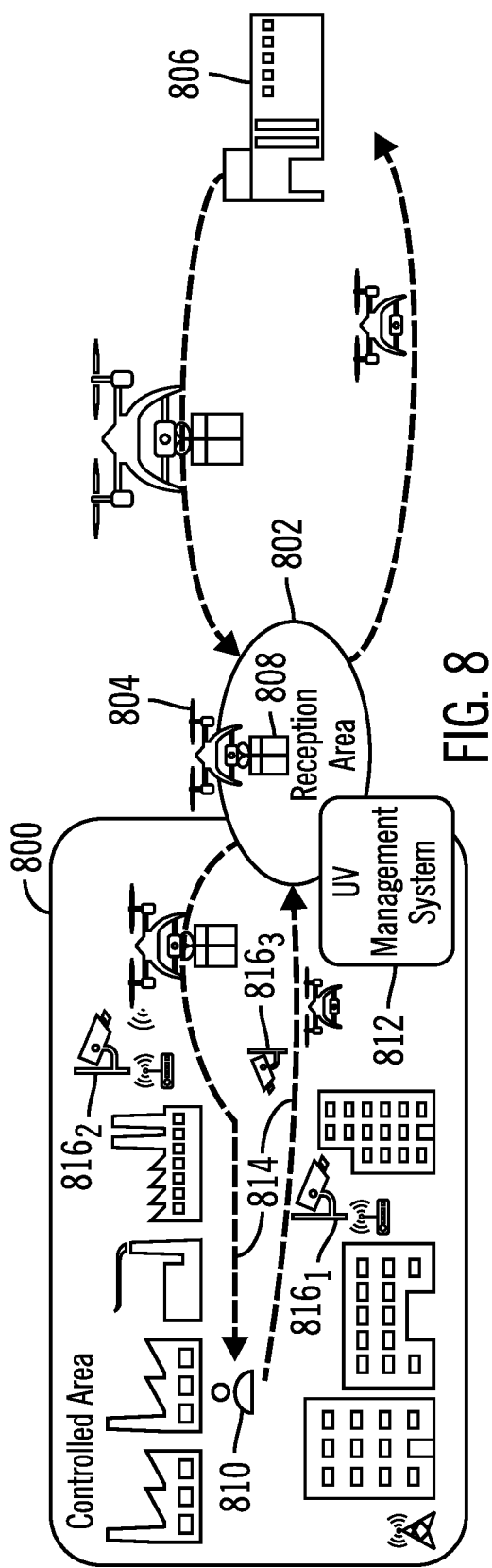
FIG. 8 illustrates an example of an operating environment where the user specified operation for the unmanned vehicle is to deliver a package to a designated location in the controlled area.

FIG. 8 illustrates an example environment in which embodiments may be implemented where the controlled area comprises a controlled area 800, such as a business plant, with a reception area 802 at which unmanned vehicles 804, such as unmanned vehicles $200_i$, are received from a vehicle provider facility 806 to deliver a package 808 to a designated location 810 in the controlled area 800. In the reception area 802, the UV management system 812, such as UV management system 100, loads a route management container 222 and maps 214 to maintain the unmanned vehicle 804 along an approved route 814 in the controlled area 800, and not allow the unmanned vehicle 804 to stray from the pre-programmed route. Further, the UV management system 812 may disable certain data collection devices in the unmanned vehicle 804, such as cameras, for security reasons. The controlled area 800 includes surveillance systems $816_1$, $816_2$, $816_3$, such as surveillance system 116, to monitor unmanned vehicles operating in the controlled area 800 according to the operations of FIG. 7.

Figure 9:
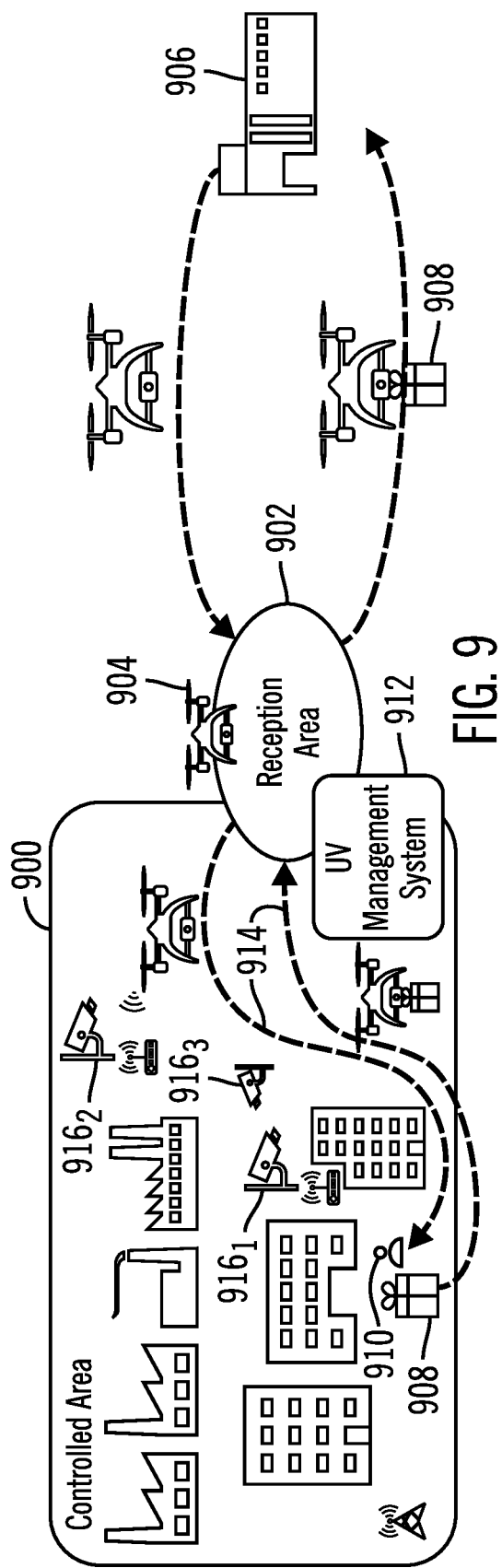
FIG. 9 illustrates an example of an operating environment where the user specified operation for the unmanned vehicle to retrieve a package at a designated location in the controlled area.

FIG. 9 illustrates a further example environment in which embodiments may be implemented where the controlled area 900 comprises a business facility with a reception area 902 at which unmanned vehicles 904, such as unmanned vehicles $200_i$, are received from a vehicle provider facility 906 to receive and pick-up a package 908 at a designated location 910 in the controlled area 900 to return to the provider facility 906 or another designated location external to the controlled area 900. In the reception area 902, the UV management system 912, such as UV management system 100, loads a route management container 222 and maps 214 to maintain the unmanned vehicle 904 along an approved route 914 in the controlled area 900, and not allow the unmanned vehicle 904 to stray from the pre-programmed route. Further, the UV management system 912 may disable certain data collection devices in the unmanned vehicle 904, such as cameras for security reason. The controlled area 900 includes surveillance systems $916_1$, $916_2$, $916_3$, such as surveillance system 116, to monitor unmanned vehicles 904 operating in the controlled area 900 according to the operations of FIG. 7.

In the embodiment of FIG. 9, the UV management system 912 when reloading the image of base vehicle containers 404 and vehicle state data and maps 406 according to the operations at block 622 in FIG. 6, may retain containers in the unmanned vehicle and state data related to monitoring the package 908 along the return route 914 to allow the continued monitoring of the package 908 on the return travel from the reception area 902 to the provider facility 906 or other location. The retained monitoring container may perform temperature control of the package 908 and may include a routing function to deliver hazardous materials in the package 908 along a safe route, such as away from populated areas, to the provider facility 906 or destination location. The package monitoring and routing containers may be destroyed upon delivery of the package 908 to the provider facility 906.

Figure 10:
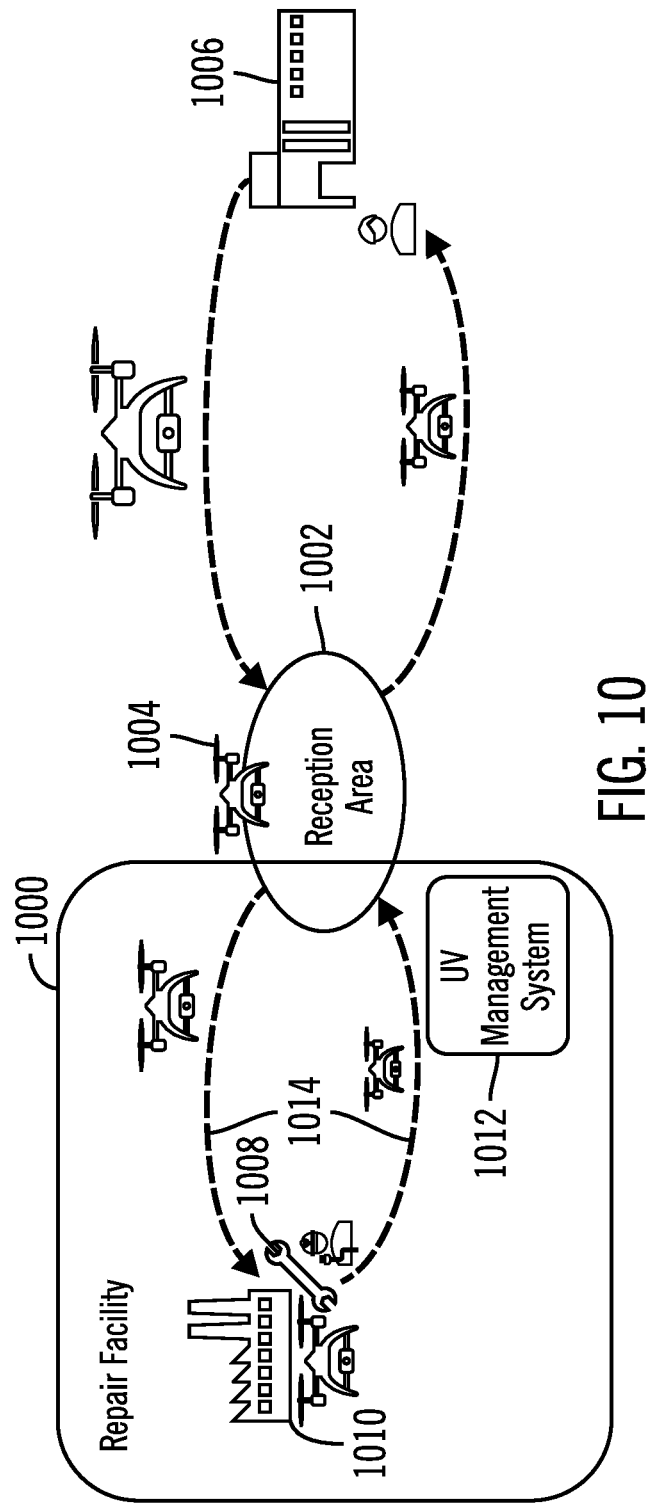
FIG. 10 illustrates an example of an operating environment where the user specified operation is to perform maintenance on the unmanned vehicle at a designated location in the controlled area.

FIG. 10 illustrates a yet further example environment in which embodiments may be implemented where the controlled area comprises a repair facility 1000 with a reception area 1002 at which unmanned vehicles 1004, such as unmanned vehicles $200_i$, are received from a vehicle provider facility 1006 to perform inspection, maintenance and repair 1008 at a designated location 1010 in the repair facility 1000. The repaired vehicle 1004 is then returned to the provider facility 1006 or another designated location external to the repair facility 1000. In the reception area 1002, the UV management system 1012, such as UV management system 100, would load a route management container 222 and maps 214 to maintain the unmanned vehicle 1004 along an approved route 1014 in the repair facility 1000, and not allow the unmanned vehicle 1004 to stray from the pre-programmed route. Further, the UV management system 1012 may disable certain data collection devices in the unmanned vehicle 1004, such as cameras for security reason. The repair facility 1000 may include surveillance systems (not shown), such as surveillance system 116, to monitor unmanned vehicles 1004 traversing the repair facility 1000 according to the operations of FIG. 7.

Figure 11:
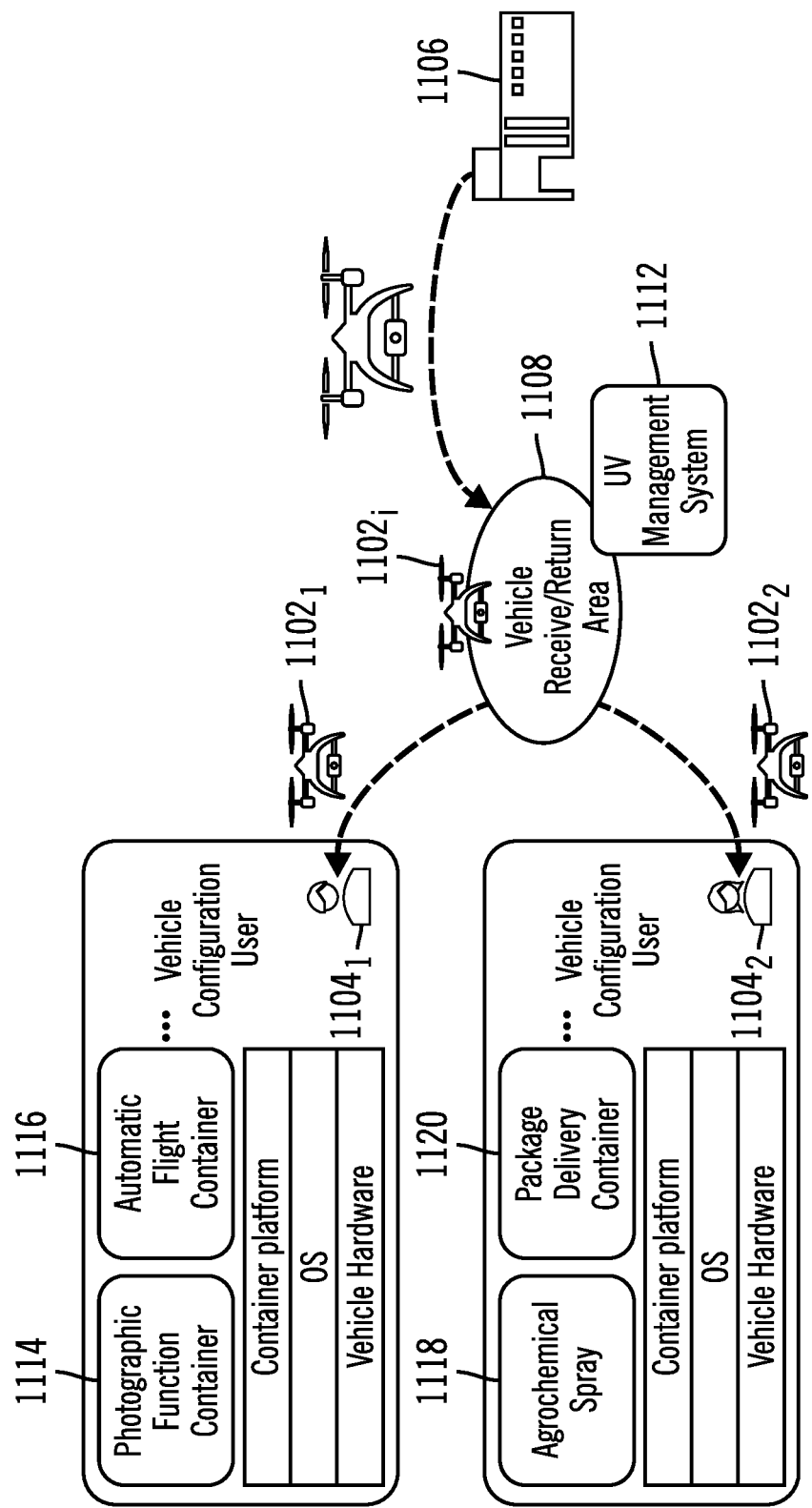
FIG. 11 illustrates an example of an operating environment where the unmanned vehicle is configured with user specified vehicle control programs to perform a user specified operation using the unmanned vehicle.

FIG. 11 illustrates an example environment in which embodiments may be implemented where the unmanned vehicles $1102_1$, $1102_2$, such as unmanned vehicle $200_i$, may be configured with specific containers for different users $1104_1$, $1104_2$ according to the users' specifications. The vehicle provider 1106 may comprise an unmanned vehicle rental or sharing service. The unmanned vehicle $1102_i$ travels to a receiving/returning area 1108 at which a UV management system 1110, such as UV management system 1112, would load user specific containers to perform user specific functions. For instance, for the unmanned vehicle $1102_1$ for user $1104_1$, the UV management system 1112 would load a photographic function container 1114 to take photos and an automatic flight container 1116 to control the flight path along a user specified route along which photographic images and videos will be captured. For the unmanned vehicle $1102_2$ for user $1104_2$, the UV management system 1112 would load an agrochemical spray container 1118 to control spraying a chemical on a crop area and a package delivery container 1120 to deliver a package to a designated location. Upon returning to the reception area 1108, the UV management system 1112 would reload the base vehicle containers 404 and vehicle state data 406 to return to the vehicle provider facility 1106 with all containers and data related to the user information wiped and deleted from the used unmanned vehicle $1102_i$.

In the embodiments of FIGS. 8, 9, 10, and 11 the areas 802, 902, 1002, 1108 are described as both reception and departure areas. In alternative embodiments, the reception and departure areas may be at different points of entry and exit to the controlled area. Alternatively, the areas 802, 902, 1002, 1102 may not be defined by a physical boundary and instead comprise a virtual area located at any point where an unmanned vehicle passes through a boundary of the controlled area 800, 900, 1000. At this virtual point where the unmanned vehicle enters the controlled area 800, 900, 1000, the UV management system 812, 912, 1012 would communicate with the detected unmanned vehicle entering the controlled area 800, 900, 1000 to load the user specific containers or reload the base containers to return to the provider facility.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
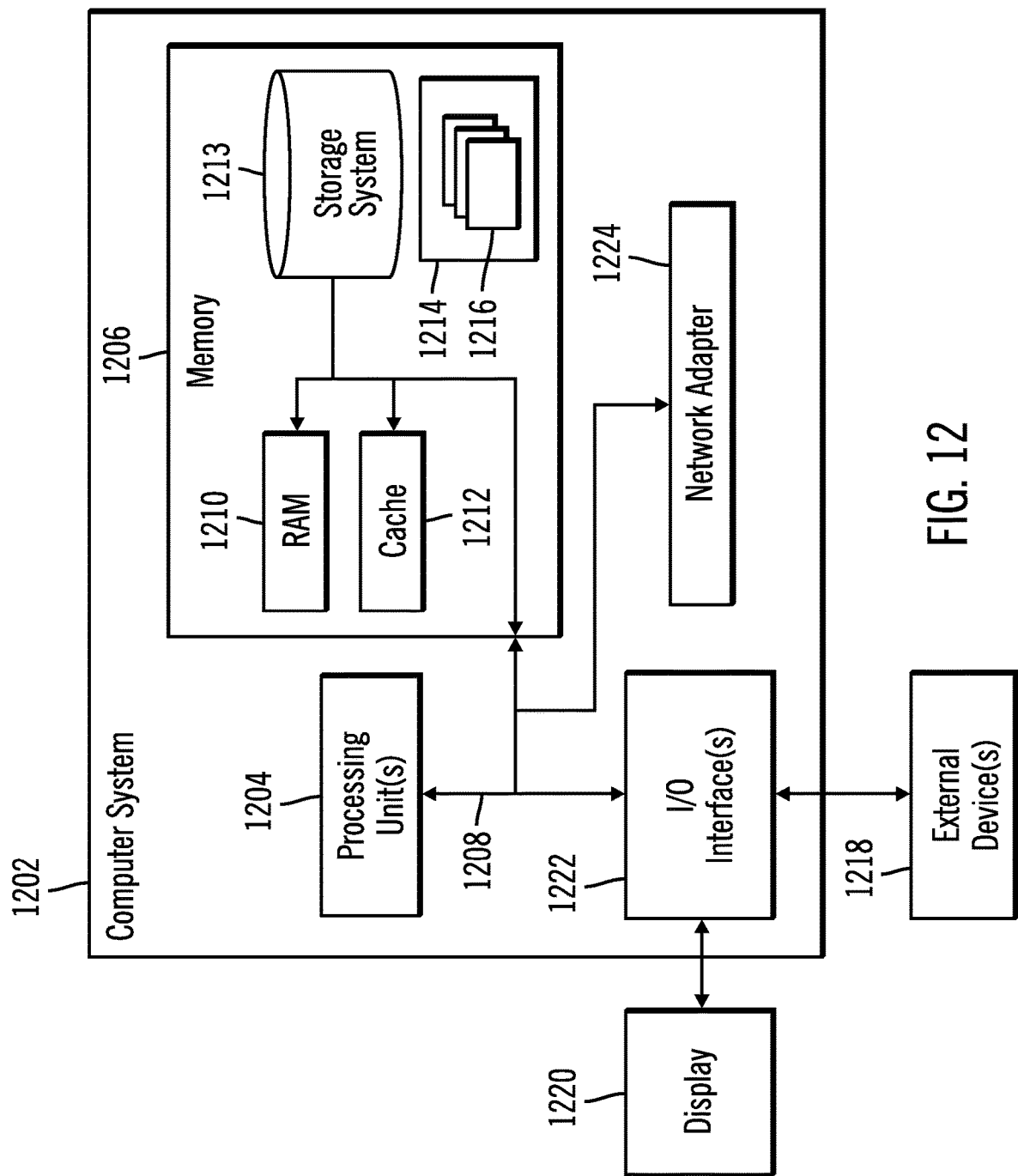
FIG. 12 illustrates a computing environment in which the components of FIGS. 1 and 2 may be implemented.

The computational components of FIGS. 1 and 2, including the UV management system 100, the surveillance system 116, the unmanned vehicles $200_1$, $200_2$, $200_i$ may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing an unmanned vehicle, wherein the computer program product comprises a computer readable storage medium having program instructions embodied therewith that when executed cause operations, the operations comprising:
loading user vehicle control programs in an unmanned vehicle to control the unmanned vehicle to perform a user specified operation in a controlled area, wherein the loading the user vehicle control programs replaces base vehicle control programs in the unmanned vehicle;
communicating with the unmanned vehicle to execute the user vehicle control programs to control the unmanned vehicle to perform the user specified operation; and
loading the base vehicle control programs into the unmanned vehicle to replace the user vehicle control programs to return control of the unmanned vehicle to a vehicle provider after performing the user specified operation in the controlled area, resulting in restoring the unmanned vehicle to a state before the user vehicle control programs took control and removing information gathered while operating the unmanned vehicle in the controlled area, including information on performing user specified operations in the controlled area.

2. The computer program product of claim 1, wherein the user vehicle control programs are loaded into the unmanned vehicle at a user receiving location in a controlled area to perform the user specified operation at a user designated location in the controlled area, wherein the user specified operation is a member of a set of user specified operations consisting of at least one of: delivering a package at the user designated location, receiving a package at the user designated location to transport from the controlled area, and perform operations at the user designated location in the controlled area.

3. The computer program product of claim 2, wherein the unmanned vehicle includes a camera, wherein the operations further comprise:
disabling the camera in the unmanned vehicle before controlling the unmanned vehicle to travel to the user designated location in the controlled area.

4. The computer program product of claim 2, wherein the user specified operation comprises the unmanned vehicle receiving a package at the user designated location in the controlled area to return to a return location outside of the controlled area, wherein the operations further comprise:
loading a package monitoring program in the unmanned vehicle, as part of loading the user vehicle control programs, to monitor the package obtained by the unmanned vehicle at the user designated location, wherein the loading the user vehicle control programs retains the package monitoring program that monitors the package while the unmanned vehicle transports the package to the return location.

5. The computer program product of claim 1, wherein the vehicle provider is unable to control the unmanned vehicle while the user vehicle control programs are installed at the unmanned vehicle.

6. The computer program product of claim 1, wherein the unmanned vehicle includes a computer hardware layer, operating system layer, and container platform to execute containers of code to control the unmanned vehicle, wherein the user vehicle control programs are implemented in user vehicle control containers and wherein the base vehicle control programs are implemented in base vehicle control containers.

7. The computer program product of claim 6, wherein the user vehicle control containers include: a positioning function container to determine a position of the unmanned vehicle while operating in a controlled area and communicate the determined position to a facility operator controlling the unmanned vehicle while travelling to a user specified destination in the controlled area; a peripheral environment recognizing function container to recognize structures in the controlled area; and a route management container to control the unmanned vehicle through a route in the controlled area to the user specified destination and to a departure area of the controlled area.

8. The computer program product of claim 1, wherein the operations further comprise:
saving the base vehicle control programs in a repository before loading the user vehicle control programs in the unmanned vehicle;
saving data from a memory in the unmanned vehicle with the base vehicle control programs as part of loading the user vehicle control programs;
erasing data from the memory in the unmanned vehicle in response to saving the data to the memory; and
writing the saved data to the memory as part of loading the base vehicle control programs back into the unmanned vehicle.

9. A computer program product for managing an unmanned vehicle, wherein the computer program product comprises a computer readable storage medium having program instructions embodied therewith that when executed cause operations, the operations comprising:
loading user vehicle control programs and a verification program in an unmanned vehicle to perform user specified operations, wherein the loading of the user vehicle control programs and the verification program replace base vehicle control programs controlled by a vehicle provider;
saving vehicle configuration information of installed programs in the unmanned vehicle, including the base vehicle control programs and the verification program, gathered by the verification program after the user vehicle control programs and verification program are loaded;
receiving, from a detected unmanned vehicle, transmitted vehicle configuration information;
determining whether the transmitted vehicle configuration information matches the saved vehicle configuration information; and
generating an alert that the unmanned vehicle is not an authorized vehicle in response to determining that the transmitted vehicle configuration information does not match the saved vehicle configuration information.

10. The computer program product of claim 9, wherein the operations further comprise:
determining a geographical position of the detected unmanned vehicle;
receiving, with the transmitted vehicle configuration information, position information determined by the detected unmanned vehicle; and
determining whether the geographical position and the position information match, wherein the alert is generated in response to determining that the position information and the geographical position do not match.

11. The computer program product of claim 9, wherein the operations further comprise:
transmitting an encryption key generated for the unmanned vehicle to the unmanned vehicle for the verification program to use for transmissions;
associating the encryption key with the saved vehicle configuration information; and
decrypting the transmitted vehicle configuration information with the encryption key, wherein the determining whether the transmitted vehicle configuration information matches comprises determining whether the decrypted transmitted vehicle configuration information matches the saved vehicle configuration information associated with the encryption key.

12. The computer program product of claim 11, wherein there are a plurality of encryption keys associated with instances of saved vehicle configuration information for unmanned vehicles in which user vehicle control programs are loaded, wherein the decrypting the transmitted vehicle configuration information comprises decrypting the transmitted vehicle configuration information with an encryption key associated with an identifier of the detected unmanned vehicle.

13. The computer program product of claim 9, wherein the unmanned vehicle includes a computer hardware layer, operating system layer, and container platform to execute containers of code to control the unmanned vehicle, wherein the user vehicle control programs are implemented in user vehicle control containers and wherein the base vehicle control programs are implemented in base vehicle control containers replaced by the user vehicle control containers, wherein a verification container of the user vehicle control containers generates the transmitted vehicle configuration information to indicate containers installed in the unmanned vehicle.

14. A system for managing an unmanned vehicle, comprising:
a processor; and
a computer readable storage medium having program instructions embodied therewith that when executed cause operations, the operations comprising:
loading user vehicle control programs in an unmanned vehicle to control the unmanned vehicle to perform a user specified operation in a controlled area, wherein the loading the user vehicle control programs replaces base vehicle control programs in the unmanned vehicle;
communicating with the unmanned vehicle to execute the user vehicle control programs to control the unmanned vehicle to perform the user specified operation; and
loading the base vehicle control programs into the unmanned vehicle to replace the user vehicle control programs to return control of the unmanned vehicle to a vehicle provider after performing the user specified operation in the controlled area, resulting in restoring the unmanned vehicle to a state before the user vehicle control programs took control and removing information gathered while operating the unmanned vehicle in the controlled area, including information on performing user specified operations in the controlled area.

15. The system of claim 14, wherein the user vehicle control programs are loaded into the unmanned vehicle at a user receiving location in a controlled area to perform the user specified operation at a user designated location in the controlled area, wherein the user specified operation is a member of a set of user specified operations consisting of at least one of: delivering a package at the user designated location, receiving a package at the user designated location to transport from the controlled area, and perform operations at the user designated location in the controlled area.

16. The system of claim 15, wherein the user specified operation comprises the unmanned vehicle receiving a package at the user designated location in the controlled area to return to a return location outside of the controlled area, wherein the operations further comprise:
loading a package monitoring program in the unmanned vehicle, as part of loading the user vehicle control programs, to monitor the package obtained by the unmanned vehicle at the user designated location, wherein the loading the user vehicle control programs retains the package monitoring program that monitors the package while the unmanned vehicle transports the package to the return location.

17. The system of claim 14, wherein the unmanned vehicle includes a computer hardware layer, operating system layer, and container platform to execute containers of code to control the unmanned vehicle, wherein the user vehicle control programs are implemented in user vehicle control containers and wherein the base vehicle control programs are implemented in base vehicle control containers.

18. The system of claim 14, wherein the operations further comprise:
saving the base vehicle control programs in a repository before loading the user vehicle control programs in the unmanned vehicle;
saving data from a memory in the unmanned vehicle with the base vehicle control programs as part of loading the user vehicle control programs;
erasing data from the memory in the unmanned vehicle in response to saving the data to the memory; and
writing the saved data to the memory as part of loading the base vehicle control programs back into the unmanned vehicle.

19. A system for managing an unmanned vehicle, comprising:
a processor; and
a computer readable storage medium having program instructions embodied therewith that when executed cause operations, the operations comprising:
loading user vehicle control programs and a verification program in an unmanned vehicle to perform user specified operations, wherein the loading of the user vehicle control programs and the verification program replace base vehicle control programs controlled by a vehicle provider;
saving vehicle configuration information of installed programs in the unmanned vehicle, including the base vehicle control programs and the verification program, gathered by the verification program after the user vehicle control programs and verification program are loaded;
receiving, from a detected unmanned vehicle, transmitted vehicle configuration information;
determining whether the transmitted vehicle configuration information matches the saved vehicle configuration information; and
generating an alert that the unmanned vehicle is not an authorized vehicle in response to determining that the transmitted vehicle configuration information does not match the saved vehicle configuration information.

20. The system of claim 19, wherein the operations further comprise:
determining a geographical position of the detected unmanned vehicle;
receiving, with the transmitted vehicle configuration information, position information determined by the detected unmanned vehicle; and
determining whether the geographical position and the position information match, wherein the alert is generated in response to determining that the position information and the geographical position do not match.

21. The system of claim 19, wherein the operations further comprise:
transmitting an encryption key generated for the unmanned vehicle to the unmanned vehicle for the verification program to use for transmissions;
associating the encryption key with the saved vehicle configuration information; and
decrypting the transmitted vehicle configuration information with the encryption key, wherein the determining whether the transmitted vehicle configuration information matches comprises determining whether the decrypted transmitted vehicle configuration information matches the saved vehicle configuration information associated with the encryption key.

22. A method for managing an unmanned vehicle, comprising:
loading user vehicle control programs in an unmanned vehicle to control the unmanned vehicle to perform a user specified operation in a controlled area, wherein the loading the user vehicle control programs replaces base vehicle control programs in the unmanned vehicle;
communicating with the unmanned vehicle to execute the user vehicle control programs to control the unmanned vehicle to perform the user specified operation; and
loading the base vehicle control programs into the unmanned vehicle to replace the user vehicle control programs to return control of the unmanned vehicle to a vehicle provider after performing the user specified operation in the controlled area, resulting in restoring the unmanned vehicle to a state before the user vehicle control programs took control and removing information gathered while operating the unmanned vehicle in the controlled area, including information on performing user specified operations in the controlled area.

23. The method of claim 22, wherein the user vehicle control programs are loaded into the unmanned vehicle at a user receiving location in a controlled area to perform the user specified operation at a user designated location in the controlled area, wherein the user specified operation is a member of a set of user specified operations consisting of at least one of: delivering a package at the user designated location, receiving a package at the user designated location to transport from the controlled area, and perform operations at the user designated location in the controlled area.

24. The method of claim 22, wherein the user specified operation comprises the unmanned vehicle receiving a package at a user designated location in a controlled area to return to a return location outside of the controlled area, further comprising:
loading a package monitoring program in the unmanned vehicle, as part of loading the user vehicle control programs, to monitor the package obtained by the unmanned vehicle at the user designated location, wherein the loading the user vehicle control programs retains the package monitoring program that monitors the package while the unmanned vehicle transports the package to the return location.

25. The method of claim 22, further comprising:
saving the base vehicle control programs in a repository before loading the user vehicle control programs in the unmanned vehicle;
saving data from a memory in the unmanned vehicle with the base vehicle control programs as part of loading the user vehicle control programs;
erasing data from the memory in the unmanned vehicle in response to saving the data to the memory; and
writing the saved data to the memory as part of loading the base vehicle control programs back into the unmanned vehicle.

* * * * *